United States Patent
Rüegg et al.

(10) Patent No.: US 10,843,832 B2
(45) Date of Patent: Nov. 24, 2020

(54) METHOD AND DEVICE FOR THERMAL ACTIVATION OF PACKAGING SLEEVES

(71) Applicant: SIG Technology AG, Neuhausen am Rheinfall (CH)

(72) Inventors: Martin Rüegg, Uhwiesen (CH); Daniel Weber, Schaffhausen (CH); Holger Pöll, Stuttgart (DE); Marco Plüss, Feuerthalen (CH)

(73) Assignee: SIG Technology AG, Neuhausen am Rheinfall (CH)

( * ) Notice: Subject to any disclaimer, the term of this patent is extended or adjusted under 35 U.S.C. 154(b) by 417 days.

(21) Appl. No.: 15/307,515

(22) PCT Filed: Apr. 29, 2015

(86) PCT No.: PCT/EP2015/059307
§ 371 (c)(1),
(2) Date: Oct. 28, 2016

(87) PCT Pub. No.: WO2015/165945
PCT Pub. Date: Nov. 5, 2015

(65) Prior Publication Data
US 2017/0050403 A1    Feb. 23, 2017

(30) Foreign Application Priority Data
Apr. 29, 2014  (DE) .......... 10 2014 006 099

(51) Int. Cl.
*B65B 51/20*    (2006.01)
*B29C 65/10*    (2006.01)
(Continued)

(52) U.S. Cl.
CPC ............ *B65B 51/20* (2013.01); *B29C 65/103* (2013.01); *B29C 66/43122* (2013.01);
(Continued)

(58) Field of Classification Search
CPC ......... B31B 1/64; B31B 50/64; B31B 50/741; B31B 50/62; B31B 50/594; B65D 59/04;
(Continued)

(56) References Cited

U.S. PATENT DOCUMENTS 2,169,345 A    8/1939 Küchler
2,467,930 A *  4/1949 Coyle ..................... B65D 3/10
                                                  229/5.5
(Continued)

FOREIGN PATENT DOCUMENTS

CN    1756697 A    4/2006
DE    69812714 T2   3/2004
(Continued)

OTHER PUBLICATIONS

DE-102006042506-A1 Machine Translation of Description (Google/EP).*

*Primary Examiner* — Christopher T Schatz
*Assistant Examiner* — Cynthia L Schaller
(74) *Attorney, Agent, or Firm* — The Webb Law Firm

(57) ABSTRACT

A method and device for thermal activation of tube-shaped packaging sleeves made of cardboard/plastic composite material, wherein a hot gas is applied to the tube-shaped packaging sleeve by a heating device in order to produce the base or the head of the packaging. To achieve even heating for the activation of the contact surfaces with production using simple construction, wherein the energy required for the activation process is used as completely as possible for the heating of the surfaces to be activated, the heating device is placed into effective contact with the surfaces to be activated by the heating device being moved inside the tube-shaped packaging sleeves for activation. The heating device has at least one nozzle element with an outlet opening, the external shape of which nozzle element corre-
(Continued)

sponds to the internal shape of the end of the tube-shaped packaging sleeve to be activated.

13 Claims, 4 Drawing Sheets

(51) Int. Cl.
*B29C 65/00* (2006.01)
*B31B 50/64* (2017.01)
*B31B 50/28* (2017.01)
*B65D 59/04* (2006.01)
*B29L 31/00* (2006.01)
*B31B 50/74* (2017.01)
*B31B 50/59* (2017.01)

(52) U.S. Cl.
CPC .... *B29C 66/72328* (2013.01); *B29C 66/8167* (2013.01); *B29C 66/9161* (2013.01); *B31B 50/28* (2017.08); *B31B 50/64* (2017.08); *B65D 59/04* (2013.01); *B29C 66/71* (2013.01); *B29C 66/7234* (2013.01); *B29C 66/72321* (2013.01); *B29L 2031/7166* (2013.01); *B31B 50/594* (2018.05); *B31B 50/741* (2017.08)

(58) Field of Classification Search
CPC ............... B65B 51/20; B29C 66/8167; B29C 66/72328; B29C 66/43122; B29C 66/9161; B29C 65/103; B29C 66/7234; B29C 66/72321; B29C 66/71; B29L 2031/7166
See application file for complete search history.

(56) References Cited

U.S. PATENT DOCUMENTS

| | | | |
|---|---|---|---|
| 3,825,408 | A | 7/1974 | Farfaglia et al. |
| 4,511,426 | A | 4/1985 | Linnér |
| 4,838,009 | A | 6/1989 | Connor et al. |
| 5,507,640 | A | 4/1996 | Gilmer et al. |
| 5,577,907 | A * | 11/1996 | Linn er ................. B29B 13/025 432/159 |
| 5,704,541 | A | 1/1998 | Mogard |
| 6,574,946 | B1 | 6/2003 | Linner |
| 7,412,813 | B2 | 8/2008 | Heil et al. |
| 9,840,344 | B2 | 12/2017 | Grabher |
| 9,932,132 | B2 | 4/2018 | Grabher |
| 2008/0277460 | A1* | 11/2008 | Mohn ..................... B65D 3/08 229/108 |
| 2009/0095801 | A1* | 4/2009 | Doll ..................... B65D 5/0209 229/125.25 |
| 2013/0305659 | A1 | 11/2013 | Kenn et al. |

FOREIGN PATENT DOCUMENTS

| | | |
|---|---|---|
| DE | 102006042506 A1 * | 3/2008 |
| DE | 102010050502 | 5/2012 |
| DE | 102010050502 A1 | 5/2012 |
| EP | 907576 | 4/1999 |
| JP | 59162018 A | 9/1984 |
| JP | 6510262 | 11/1994 |
| JP | 06510262 A | 11/1994 |
| JP | 9142417 A | 6/1997 |
| JP | 2000508994 A | 7/2000 |
| JP | 2003011249 A | 1/2003 |
| JP | 3913219 B2 | 2/2007 |
| JP | 3913219 B2 | 5/2007 |
| JP | 2008501588 A | 1/2008 |
| WO | 9739958 A1 | 10/1997 |

* cited by examiner

METHOD AND DEVICE FOR THERMAL ACTIVATION OF PACKAGING SLEEVES

CROSS-REFERENCE TO RELATED APPLICATIONS

This application is the United States national phase of International Application No. PCT/EP2015/059307 filed Apr. 29, 2015, and claims priority to German Patent Application No. 10 2014 006 099.3 filed Apr. 29, 2014, the disclosures of which are hereby incorporated in their entirety by reference.

BACKGROUND OF THE INVENTION

Field of the Invention

The invention relates to a method for thermal activation of tube-shaped packaging sleeves made of cardboard/plastic composite material, in particular for packaging for liquid foods, wherein a hot gas is applied to the tube-shaped packaging sleeve by a heating device in order to produce the base or the head of the packaging, wherein the heating device is placed into effective contact with the surfaces to be activated by the heating device being moved inside the tube-shaped packaging sleeves for activation, and wherein the tube-shaped packaging sleeve is arranged on a mandrel of a mandrel wheel. Further, the invention relates to a device for thermal activation of tube-shaped packaging sleeves made of cardboard/plastic composite material, in particular for packaging for liquid foods, wherein a hot gas is applied to the tube-shaped packaging sleeve by a heating device in order to produce the base or the head of the packaging and wherein the heating device has at least one nozzle element with an outlet opening, the external shape of which nozzle element corresponds to the internal shape of the end of the tube-shaped packaging sleeve to be activated.

DESCRIPTION OF RELATED ART

The production of rectangular packaging made of cardboard/plastic composite material, in particular for liquid foods, has been known for a long time. This packaging often has a rectangular or quadratic cross section over the entire height, but recently packaging has also been available on the market which does not have a constant cross section over its entire height. Materials (laminate) which are attached to one another over their entire surface are used as the packing materials for packaging of this type, with a cardboard layer as a carrier material and laminated plastic layers to protect against the penetration of moisture into the carrier material. Depending on the type of packaging and the product to be packaged, the laminate can also consist of further layers, for example a thin layer of aluminium foil as a barrier to oxygen and light or further plastic layers such as EVOH and the layers of bonding agents which are required as a result.

In most cases, in particular in the beverages sector, the known composite packaging consists of combined opening and pouring elements which are attached to the respective composite packaging in a liquid-tight manner. A composite packaging of this type is known from EP 0 907 576 A1, which contains a pouring element made of plastics material on its head side which is incorporated into the composite packaging in a filling machine. In order to do this, initially a tube-shaped packaging sleeve is prefabricated from a cut through a longitudinal seam in the PE layers. The further processing then takes place on a mandrel wheel, wherein the tube-shaped packaging sleeve is slid on a mandrel with a quadratic cross section in order first to form the protruding free end of the later composite packaging and to seal it. When, as shown, the composite packaging is to be provided with a pouring element, the head side of the composite packaging is completed first, wherein the pouring element is supplied by the mandrel and the tube-shaped packaging sleeve is slid on this. The folding of the head is carried out by means of previously introduced crease lines, wherein the gable surface to be shifted is shifted onto the front face of the mandrel using pressing tools. For a permanent and liquid-tight connection, the relevant contact surfaces of the composite material are heated using a hot gas, for example using sterile hot air, so that the outer PE surfaces melt locally and are thereby activated. The activated PE surfaces are then pressurised by the pressing tools for a long enough period for the completed gable surface to cool in a liquid-tight manner.

A device and a method for the production of packaging in which a pouring element is incorporated into the gable surface is known from DE 10 2010 050 502 A1, which pouring element is not arranged in a flat gable surface but rather in a gable in the form of frustum of a pyramid. In addition to the four gable surfaces, packaging produced in this way also has four ears in the gable region which stick out from the gable region and are formed from excess packaging material, which ears are shifted onto the gable surfaces and attached there. The basic production here is the same, namely by means of the activation of the contact surfaces to be sealed by means of sterile hot air, wherein the tube-shaped packaging is also slid on the mandrel of a mandrel wheel.

The activation process in the known manufacturing procedure therefore takes place by means of heating devices with the addition of the hot gas used for activation. In doing this, the duration and temperature of the activation have to be optimally tailored to the composite material in order to achieve the desired liquid-tight connection of the gable region. The same also applies to packaging in which the folding and sealing of the base region is carried out first, which packaging is not filled from the bottom but rather from the top in the "classical manner". Some of the known heating devices have a complicated structure and are therefore expensive to manufacture and maintenance-intensive.

SUMMARY OF THE INVENTION

The object of the invention is therefore to design and further develop the method mentioned at the start and a corresponding device for thermal activation of tube-shaped packaging sleeves such that the heating device used can be produced with a simple construction and an even heating to activate the contact surfaces is achieved. Furthermore, there is a desire that the energy required for the activation process be used as completely as possible for the heating of the surfaces to be activated.

According to the method, the object is achieved in that before the introduction of the heating device, the free end of the tube-shaped packaging sleeve is deformed from a rectangular or quadratic cross section to a round cross section. By means of internal contact of this type, the energy required for the activation process is placed directly and evenly in the surfaces to be heated. While the mandrel has a rectangular or quadratic cross section corresponding to the later shape of the packaging, the invention has identified that temporarily shaping the free end into a round cross section for the activation process is extremely advantageous. In this way, there is a particularly even heating, as there are no edge or corner regions in which the hot gas can build up. This leads to an improved sealing process and to an optimal energy efficiency, without the risk of overheating.

In terms of a corresponding device, the present object is achieved in that the free end of the nozzle element is cylindrical in shape, and in that devices for the deformation of the free end of the tube-shaped packaging sleeve are provided. According to the invention, this ensures that all of the hot air reaches the plastic surfaces of the composite material to be activated directly and ensures the optimal utilisation of the energy used. From a constructive perspective, this is particularly practical if the diameter of the external shape of the cylindrical nozzle element almost corresponds to the internal diameter of the tube-shaped packaging sleeve which now has a round cross section in the activation region. By coordinating the construction of the nozzle element and the packaging sleeve, the energy used can be used directly to activate the plastic surfaces without any losses occurring.

Further teaching of the invention provides for the heating device to be moved relative to the tube-shaped packaging sleeve during the activation process. By doing this, the surface to be activated can be increased by means of a movement of the output openings for the hot gas. However, it is also possible to carry out the activation process without relative movement.

A further embodiment of the invention provides for the outlet openings of the nozzle element to be slit-shaped or perforated. It is particularly advantageous if, according to a further embodiment of the invention, the outlet opening of the nozzle element is designed as a circumferential annular gap. On the one hand, this permits a particularly favourable production of the nozzle element and on the other hand it enables an extremely even heating of the surfaces to be activated.

According to a further teaching of the invention, the nozzle element has a cylindrical outer part and an inner part which can be connected to said outer part, in addition to an annulus between the outer part and the inner part as an annular channel for the supply of the hot gas. From a constructive perspective, a cylindrical nozzle is extremely easy to produce as a rotation part, expediently with an external diameter which essentially corresponds to the internal diameter of the free end of the temporarily reshaped tube-shaped packaging sleeve.

A further preferred embodiment of the invention provides for the outlet openings to end in a circumferential recess. In this way, no additional channels, holes or the like are needed to feed the hot gas into the circumferential recess. This not only means a particularly simple type of production, but also particularly even heating and therefore an improved sealing process.

A further teaching of the invention provides for the outer part and the inner part to be able to be moved in an axial direction relative to one another in order to adjust the size of the gap. In this way, an optimal setting for the necessary hot gas for the respective activation process can be defined and set and, if necessary, also adjusted to changed conditions such as another packaging sleeve with little effort.

In a further embodiment of the invention, it is provided that the inner part can be adjusted in a thread of a holding element which is firmly fixed to the outer part. A construction of this type is particularly expedient, as this means that very precise adjustment is possible. The adjustment is preferably carried out from the outside by means of a hexagon key, wherein the inner part has a corresponding centrally arranged hexagon socket.

Another embodiment of the invention provides for the inner part to be secured in the holding element by means of a screw and/or a counter element. This means that the inner part is fixed in a manner which ensures adjustment.

A further teaching of the invention provides for the above mentioned devices for deforming the free end of the tube-shaped packaging sleeve to have several tools which act on the packaging sleeve from outside in a radial direction and the mesh positions of which together form a round internal shape. In doing this, it is particularly expedient if semi-hollow cylindrical shaping jaws are provided as tools, which are arranged diametrically opposing one another and which by means of moving towards one another temporarily change the free end of the tube-shaped packaging sleeve from its rectangular or quadratic cross section into the desired round shape.

An alternative embodiment of the devices for deforming the free end of the tube-shaped packaging sleeve provides for a die which can be slid in an axial direction onto the packaging sleeve to be provided, which die can be moved in an axial direction on the outside around the mandrel and on to the mandrel wheel, wherein the free end of the die passes from the cross sectional shape of the mandrel into a region with a circular cross section. However, the production of a die of this type is significantly more costly than the preferred tong elements.

The invention is described in greater detail below using a drawing which merely shows one preferred exemplary embodiment.

DESCRIPTION OF THE INVENTION

Figure 1:
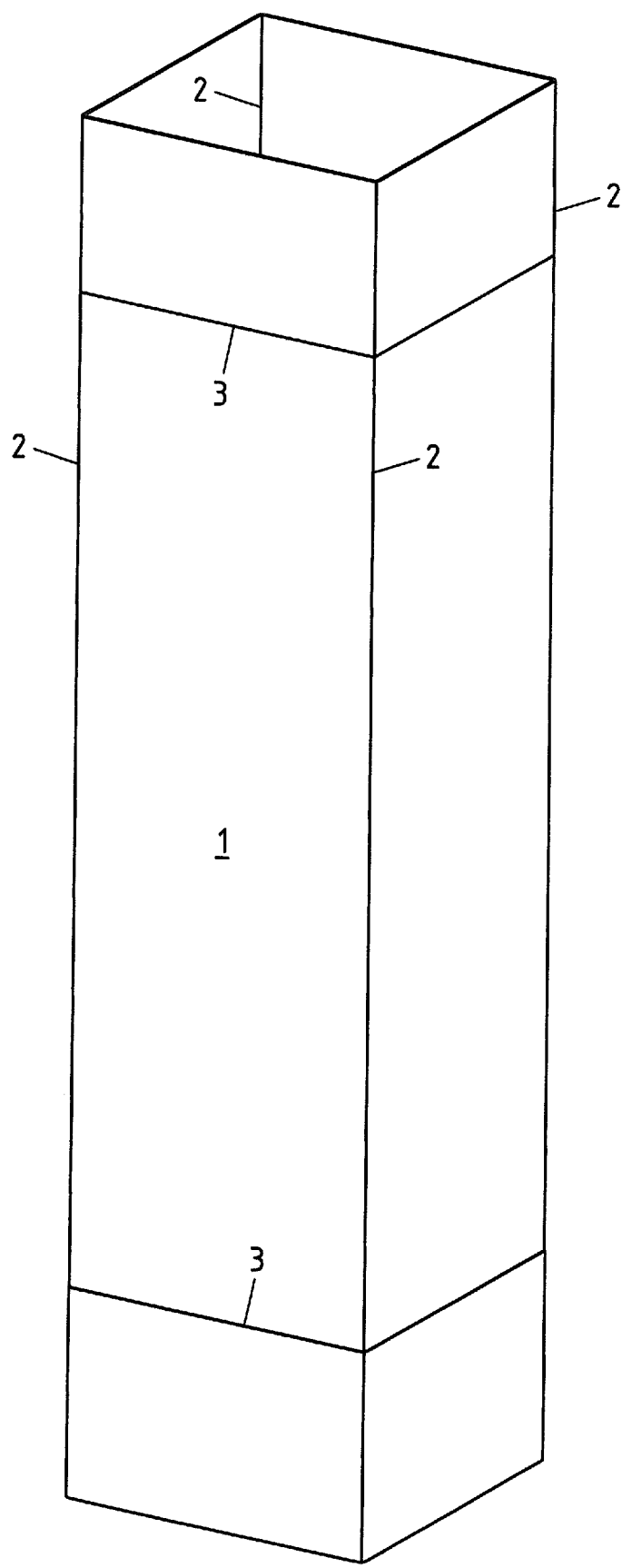
FIG. 1 shows a perspective view of a tube-shaped packaging sleeve.

FIG. 1 shows a tube-shaped packaging sleeve 1 as the packaging material for a future drinks package. A packaging sleeve 1 of this type is produced by longitudinal sealing from a cut, wherein the longitudinal seam is not shown. This can be in any position, for example in the central region or on one of the edges 2. Furthermore, crease lines 3 can be identified which are used to fold the base and gable region (head region) of the future packaging.

Figure 2:
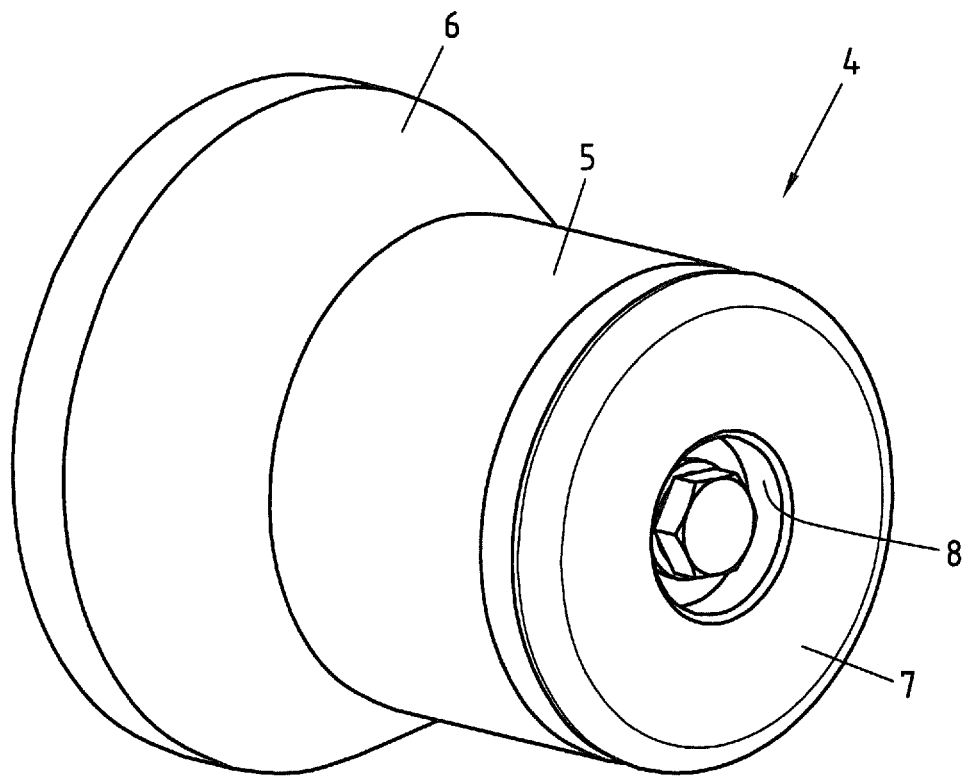
FIG. 2 shows a perspective view of a nozzle element of a device according to the invention.

FIG. 2 shows a nozzle element 4 ideally used for the device according to the invention, which initially and essentially comprises a hollow cylindrical outer part 5 with a conical distribution 6 and an inner part 7 arranged in the outer part 5, wherein the inner part 7 almost completely seals the open side of the hollow cylinder-shaped outer part 5. On the front face of the inner part 7, a recess 8 can be identified which is used to receive the head of a screw 9 to attach the outer part 5 to the inner part 7.

Figure 3A:
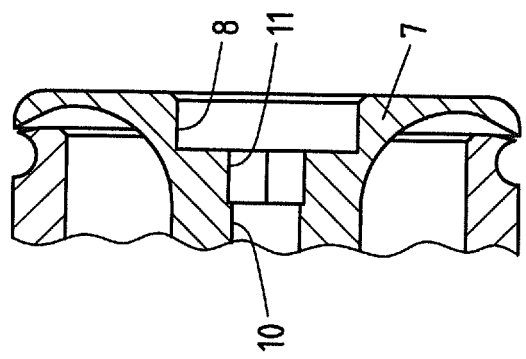
FIG. 3a shows a partially open view of the outer part and inner part of the nozzle element and FIG. 4 shows a perspective view of the nozzle element in the activation position with a section through the packaging sleeve to provide a better view.
Figure 3:
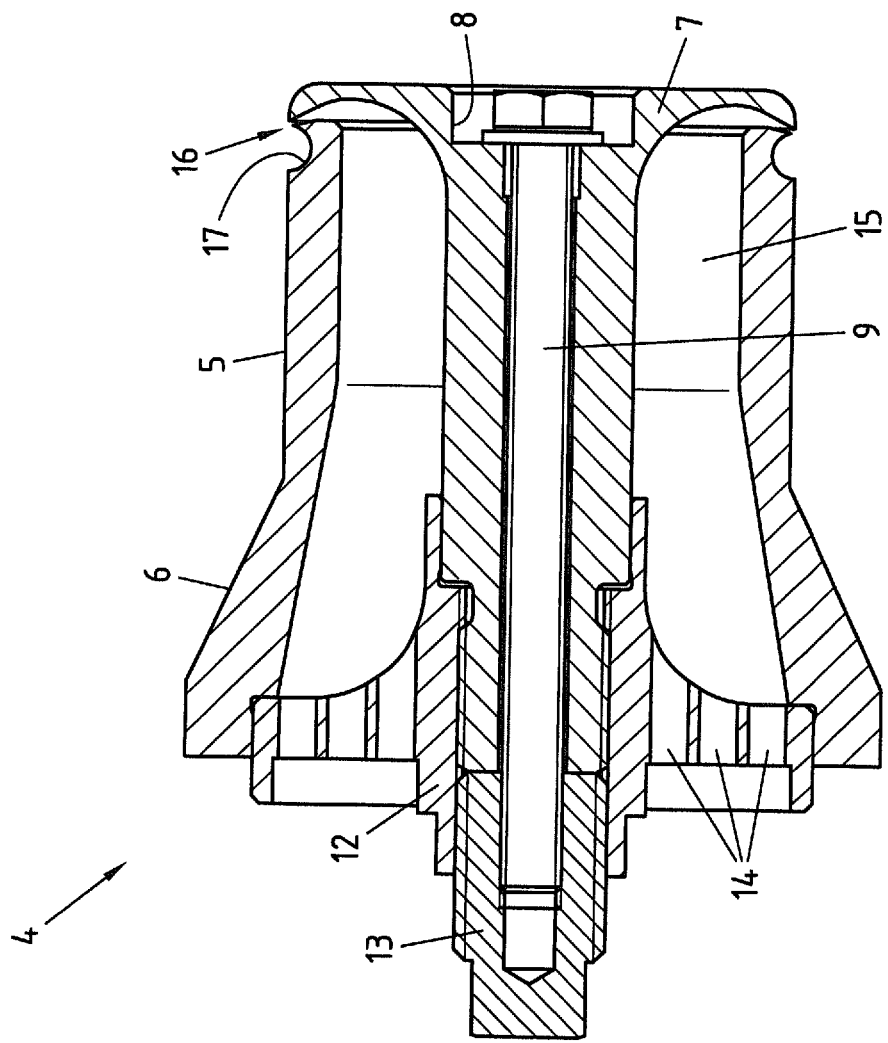
FIG. 3 shows an axial section of the nozzle element from FIG. 2.

In order to provide a better view, in FIG. 3 the nozzle element 4 is shown in an axial section. It is evident here that the inner part 7 has a central hole 10 which ends in the recess 8 and has a hexagon socket 11 in the end region. The fixing of the outer part 5 and the inner part 7 is carried out by means of the above mentioned screw connection through this hole 10. Here, the screw 9 is screwed through the recess 8 and the hole 10 with a holding element 12, wherein the screw head remains in the recess 8. The holding element 12 is coherently connected to the external element 5 and has an internal thread (not shown) into which the outer thread of the internal end of the inner part 7 is screwed and can therefore be adjusted in an axial direction.

In the open view according to FIG. 3a, it is possible to identify that the hole 10 has a hexagon socket 11 in its end region adjacent to the recess 8. This hexagon socket 11 is used for the relative adjustment of outer part 5 and inner part 7 in an axial direction, as explained below in greater detail. The end of the screw 9 meshes with an internal thread of a counter element 13, creating a precisely distanced fixation of the outer part 5 and the inner part 7, as can be clearly seen in FIG. 3a.

The holding element 12 has a sufficient number of channels 14 for the hot gas to pass through. This lead to an annulus 15 between the inner part 7 and the outer part 5. The supply of the hot gas necessary for activation, for example sterile hot air, is preferably carried out in the embodiment shown in FIG. 3, in which a narrow annular gap 16 remains as an outlet opening between the external edge of the front face of the inner part 7 and the hollow cylinder-shaped outer part 5, such that an even outlet of the hot gas occurs in a circumferential manner over the entire length of the nozzle element 4. Immediately behind the nozzle outlet opening, there is a circumferential recess 17 in the embodiment shown and in this respect preferred, as can clearly be seen in FIGS. 2, 3 and 3a. This enables a particularly even supply of gas from a flow technology perspective.

Figure 4:
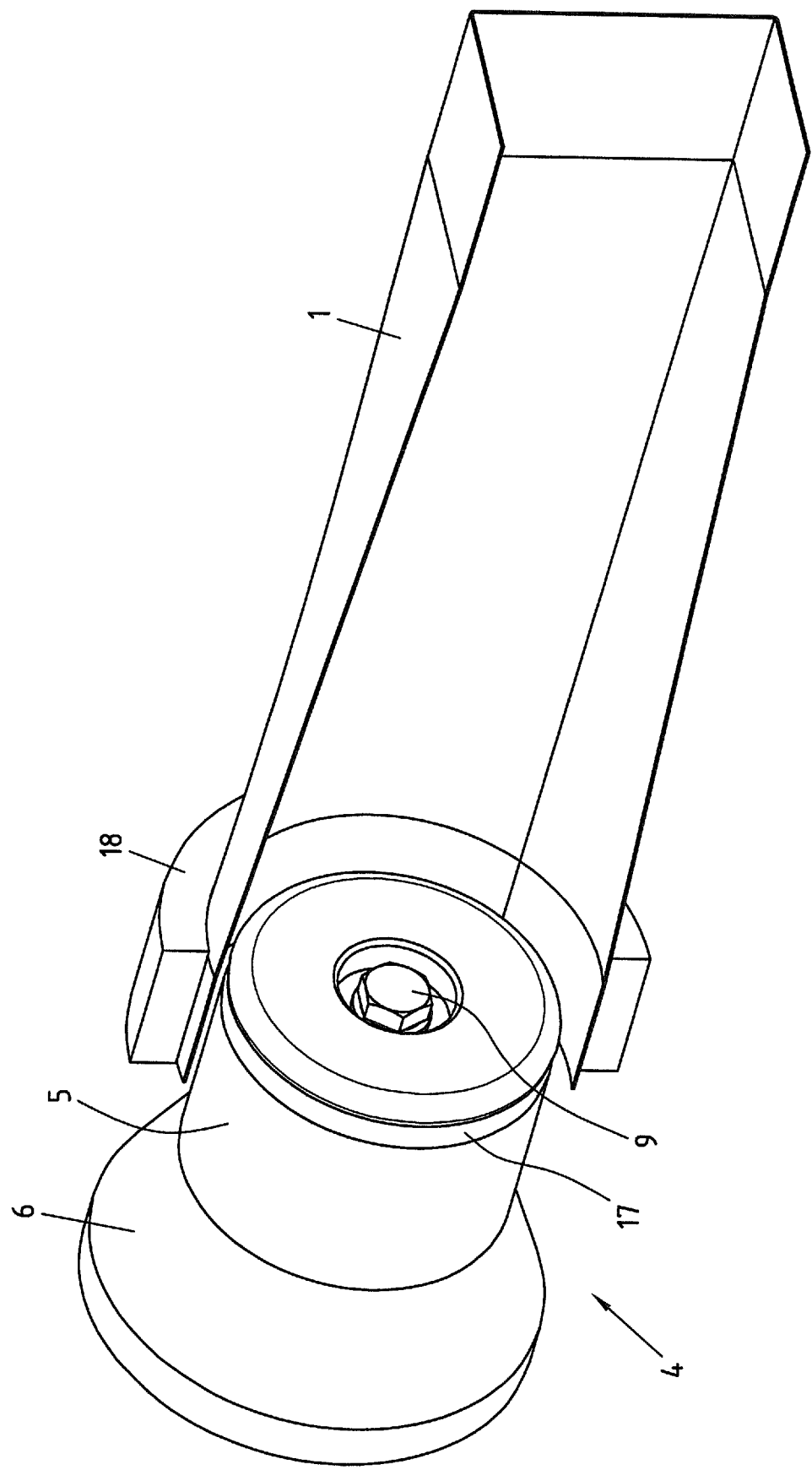

FIG. 4 finally shows the nozzle element 4 described in greater detail above during an activation process. The nozzle element 4 is introduced into the open end of a packaging sleeve, the other end of which is slid on a mandrel (not shown) of a mandrel wheel. It is recognised that the external diameter of the cylindrical outer part 5 of the nozzle element 4 approximately corresponds to the internal diameter of the formed, tube-shaped packaging sleeve 1, which is shown with a section through the middle to provide a better view.

In order that the free end of the tube-shaped packaging sleeve 1 can now be changed into the desired round shape, according to the invention two semi-hollow cylindrical shaping jaws 18 ensure the corresponding shaping. Here too, only one of the two shaping jaws 18 is shown for reasons of clarity. In order to carry out the deformation, the two shaping jaws 18 are moved towards one another, wherein the free end of the tube-shaped packaging sleeve 1 is "automatically" changed into the desired round shape in a simple and elegant manner.

Optimal energy utilisation in the activation process is achieved with the solution according to the invention, wherein reliably an optimally equal activation is achieved by means of the equal application of the hot gas over the entire circumference of the nozzle element.

The invention claimed is:

1. A method for thermal activation of a tube-shaped packaging sleeve made of cardboard/plastic composite material, comprising the step of applying a hot gas to the tube-shaped packaging sleeve by a heating device in order to produce a base or a head of the packaging, wherein the heating device has at least one nozzle element with a cylindrical outer part and an inner part which can be connected to said outer part, and wherein an annulus between the outer part and inner part is designed as an annular gap for the supply of the hot gas, wherein the heating device is placed into contact with surfaces to be activated by the heating device being moved inside the tube-shaped packaging sleeve for activation, wherein the outer part and the inner part are moved in an axial direction relative to one another in order to adjust a size of the annular gap, wherein the tube-shaped packaging sleeve is arranged on a mandrel of a mandrel wheel and wherein before the heating device is placed into contact with or close proximity to the surfaces to be activated, a free end of the tube-shaped packaging sleeve is deformed from a rectangular or square cross section to a round cross section.

2. The method according to claim 1,
wherein the heating device is moved relative to the tube-shaped packaging sleeve during the activation process.

3. A device for thermal activation of a tube-shaped packaging sleeve made of cardboard/plastic composite material, comprising: a heating device and devices for deforming a free end of the tube-shaped packaging sleeve; wherein the heating device is configured to apply a hot gas to the tube-shaped packaging sleeve in order to produce a base or a head of the packaging, wherein the heating device has at least one nozzle element with at least one outlet opening, an external shape of which at least one nozzle element corresponds to an internal shape of the free end of the tube-shaped packaging sleeve to be activated, and wherein a free end of the at least one nozzle element is cylindrical in shape, wherein the at least one nozzle element has a cylindrical outer part and an inner part which can be connected to said outer part, and wherein an annulus between the outer part and inner part is designed as an annular gap for the supply of the hot gas, wherein the at least one outlet opening ends in a circumferential recess, and wherein the outer part and the inner part are moveable in an axial direction relative to one another in order to adjust a size of the annular gap.

4. The device according to claim 3,
wherein the at least one outlet opening of the nozzle element is slit-shaped or perforated.

5. The device according to claim 3,
wherein the at least one outlet opening of the nozzle element is designed as a circumferential annular gap.

6. The device according to claim 3,
wherein the inner part is adjustable in a thread of a holding element which is firmly fixed to the outer part.

7. The device according to claim 6,
wherein the inner part is secured in the holding element by a screw and/or a counter element.

8. The device according to claim 6,
wherein the inner part comprises a centrally arranged hexagon socket.

9. The device according to claim 3,
wherein the devices for deforming the free end of the tube-shaped packaging sleeve comprise several tools which act on the packaging sleeve from outside in a radial direction and mesh positions of which together form a round internal shape.

10. The device according to claim 9,
wherein the several tools comprise semi-hollow cylindrical shaping jaws.

11. The device according to claim 3,
wherein the devices for deforming the free end of the tube-shaped packaging sleeve comprise a die slideable in an axial direction onto the packaging sleeve.

12. The device according to claim 4, wherein the devices for deforming the free end of the tube-shaped packaging sleeve comprise several tools which act on the packaging sleeve from outside in a radial direction and mesh positions of which together form a round internal shape.

13. The device according to claim 5, wherein the devices for deforming the free end of the tube-shaped packaging sleeve comprise several tools which act on the packaging sleeve from outside in a radial direction and mesh positions of which together form a round internal shape.

\* \* \* \* \*